United States Patent
Hirose et al.

(10) Patent No.: US 10,859,426 B2
(45) Date of Patent: Dec. 8, 2020

(54) METHOD OF INSPECTING FLOW RATE MEASURING SYSTEM

(71) Applicant: TOKYO ELECTRON LIMITED, Tokyo (JP)

(72) Inventors: Jun Hirose, Miyagi (JP); Norihiko Amikura, Miyagi (JP); Risako Miyoshi, Miyagi (JP); Shinobu Onodera, Miyagi (JP)

(73) Assignee: TOKYO ELECTRON LIMITED, Tokyo (JP)

( * ) Notice: Subject to any disclaimer, the term of this patent is extended or adjusted under 35 U.S.C. 154(b) by 175 days.

(21) Appl. No.: 16/117,630

(22) Filed: Aug. 30, 2018

(65) Prior Publication Data
US 2019/0063987 A1 Feb. 28, 2019

(30) Foreign Application Priority Data

Aug. 31, 2017 (JP) .................. 2017-166950

(51) Int. Cl.
*G01F 25/00* (2006.01)
*G01F 3/22* (2006.01)
*G05D 7/00* (2006.01)
*G01F 15/00* (2006.01)

(52) U.S. Cl.
CPC .......... *G01F 25/0053* (2013.01); *G01F 3/221* (2013.01); *G01F 3/226* (2013.01); *G05D 7/00* (2013.01); *G01F 15/005* (2013.01)

(58) Field of Classification Search
CPC .. G01F 25/0007; G01F 25/0053; G01F 3/221; G01F 3/226; G01F 15/005; G01F 15/0479; G05D 7/00; F28F 27/00; F28F 27/02
See application file for complete search history.

(56) References Cited

U.S. PATENT DOCUMENTS 9,410,753 B2 * 8/2016 Makabe .................. F28F 27/02
10,067,514 B2 * 9/2018 Kiyohara ............. G05D 11/132

FOREIGN PATENT DOCUMENTS

JP           2012-32983 A      2/2012

\* cited by examiner

*Primary Examiner* — Suman K Nath
(74) *Attorney, Agent, or Firm* — Rothwell, Figg, Ernst & Manbeck P.C.

(57) ABSTRACT

Disclosed is a method of inspecting a flow rate measuring system used in a substrate processing system. The flow rate measuring system provides a gas flow path used for calculating a flow rate in a build-up method. A gas output by a flow rate controller of a gas supply unit of the substrate processing system may be supplied to the gas flow path. In the method, apart from a previously obtained initial value of a volume of the gas flow path, a volume of the gas flow path is obtained at the time of inspection of the flow rate measuring system. Then, the obtained volume is compared to the initial value.

7 Claims, 4 Drawing Sheets

METHOD OF INSPECTING FLOW RATE MEASURING SYSTEM

CROSS-REFERENCE TO RELATED APPLICATION

This application is based on and claims priority from Japanese Patent Application No. 2017-166950 filed on Aug. 31, 2017 with the Japan Patent Office, the disclosure of which is incorporated herein in its entirety by reference.

TECHNICAL FIELD

The present disclosure relates to a method of inspecting a flow rate measuring system.

BACKGROUND

In a substrate processing, a substrate is disposed within an inner space of a chamber body, a gas is supplied to the inner space, and the substrate is processed by the supplied gas. In the substrate processing, a flow rate of the gas supplied to the inner space of the chamber body is controlled by a flow rate controller. The accuracy in the control of the flow rate of the gas affects the result of the substrate processing. Therefore, the flow rate of the gas output by the flow rate controller is measured, and a process recipe for the substrate processing is adjusted using the measured flow rate. Thus, it is required to measure the flow rate of the gas with a high accuracy.

As one method of measuring the flow rate of the gas, a build-up method is used. The build-up method is described in Japanese Patent Laid-Open Publication No. 2012-032983. In the build-up method described in Japanese Patent Laid-Open Publication No. 2012-032983, a volume of a gas flow path is obtained in advance. Then, the flow rate is obtained from an increase rate of a pressure within the gas flow path, a temperature within the gas flow path, and an obtained volume.

SUMMARY

In an aspect, there is provided a method of inspecting a flow rate measuring system used in a substrate processing system. The substrate processing system includes a plurality of chamber bodies, a plurality of gas supply units, and a plurality of exhaust devices. Each of the plurality of gas supply units is configured to supply a gas to an inner space of a corresponding chamber body among the plurality of chamber bodies. Each of the plurality of gas supply units includes a casing, a plurality of flow rate controllers, a first gas flow path, and a first valve. The plurality of flow rate controllers are provided within the casing. The first gas flow path includes a plurality of first end portions, a second end portion, and a third end portion. The plurality of first end portions are connected to secondary sides of the plurality of flow rate controllers, respectively. The plurality of first end portions, the second end portion, and a portion of the first gas flow path extending from the plurality of first end portions to the second end portion are provided within the casing. The third end portion is provided outside the casing, and is connected to the inner space of the corresponding chamber body through an ON/OFF valve. The first valve is provided within the casing and connected to the second end portion. The plurality of exhaust devices are connected to inner spaces of the plurality of chamber bodies through a plurality of exhaust flow paths, respectively.

The foregoing summary is illustrative only and is not intended to be in any way limiting. In addition to the illustrative aspects, exemplary embodiments, and features described above, further aspects, exemplary embodiments, and features will become apparent by reference to the accompanying drawings and the following detailed description.

DETAILED DESCRIPTION

Figure 1:
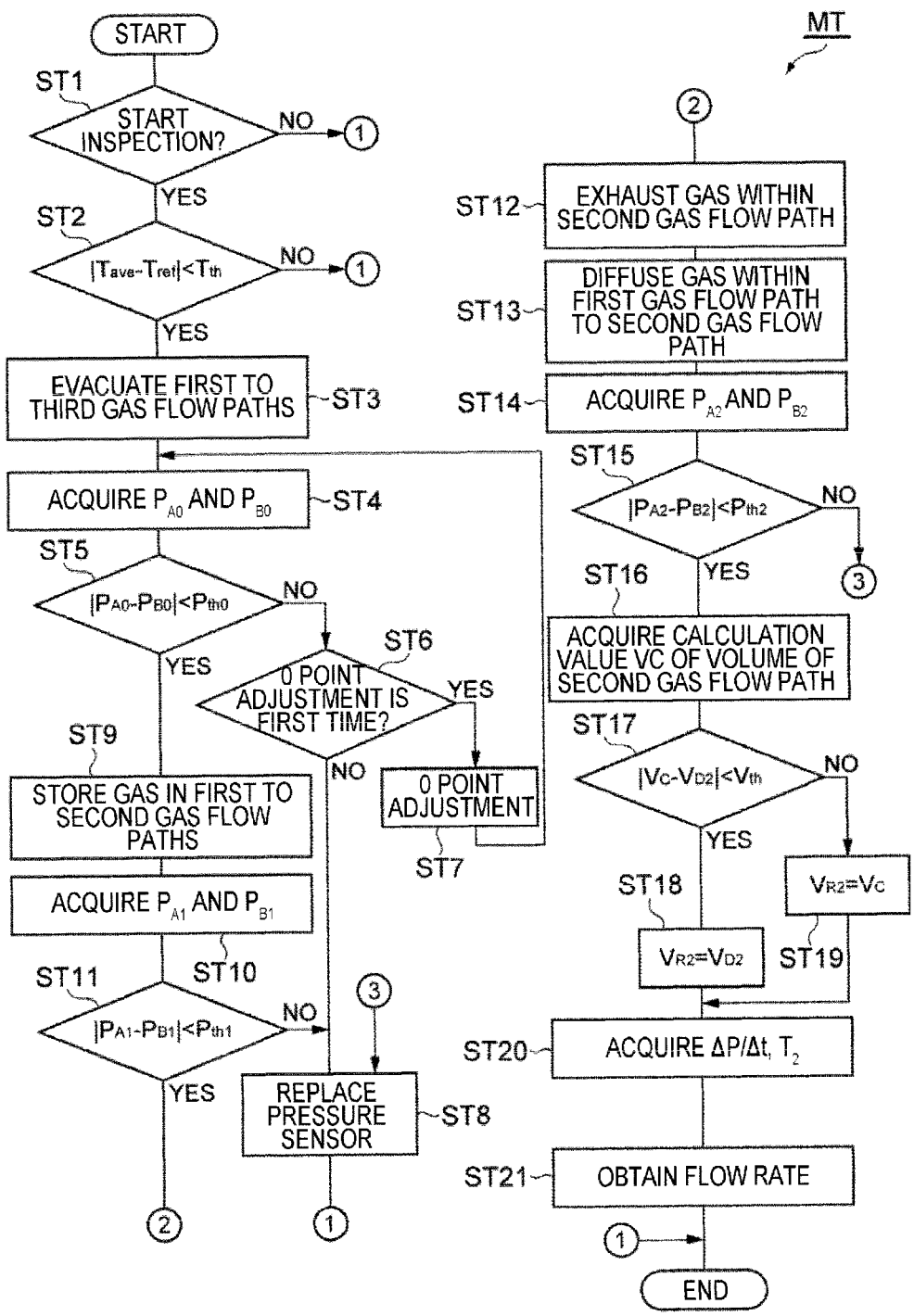
FIG. 1 is a flow chart illustrating a method of inspecting a flow rate measuring system according to an exemplary embodiment.

In the following detailed description, reference is made to the accompanying drawings, which form a part thereof. The illustrative exemplary embodiments described in the detailed description, drawings, and claims are not meant to be limiting. Other exemplary embodiments may be utilized, and other changes may be made without departing from the spirit or scope of the subject matter presented here.

In the build-up method, in the case where a temperature within the gas flow path when the volume was obtained is different from a temperature of the gas flow path when other parameters required for calculating the flow rate are acquired, the flow rate of the gas may not be accurately obtained. Accordingly, it is required to inspect whether a flow rate measuring system that provides a gas flow path used in a build-up method is placed in a state suitable for accurately obtaining a flow rate of a gas.

In an aspect, there is provided a method of inspecting a flow rate measuring system used in a substrate processing system. The substrate processing system includes a plurality of chamber bodies, a plurality of gas supply units, and a plurality of exhaust devices. Each of the plurality of gas supply units is configured to supply a gas to an inner space of a corresponding chamber body among the plurality of chamber bodies. Each of the plurality of gas supply units includes a casing, a plurality of flow rate controllers, a first gas flow path, and a first valve. The plurality of flow rate controllers are provided within the casing. The first gas flow path includes a plurality of first end portions, a second end portion, and a third end portion. The plurality of first end portions are connected to secondary sides of the plurality of flow rate controllers, respectively. The plurality of first end portions, the second end portion, and a portion of the first gas flow path extending from the plurality of first end portions to the second end portion are provided within the casing. The third end portion is provided outside the casing, and is connected to the inner space of the corresponding chamber body through an ON/OFF valve. The first valve is provided within the casing and connected to the second end portion. The plurality of exhaust devices are connected to inner spaces of the plurality of chamber bodies through a plurality of exhaust flow paths, respectively.

The flow rate measuring system includes a second gas flow path, a first pressure sensor, a second pressure sensor, a temperature sensor, a second valve, and a third gas flow path. The second gas flow path includes a plurality of fourth end portions and a fifth end portion. Each of the plurality of fourth end portions is connected to the first valve of a corresponding gas supply unit among the plurality of gas supply units. The first pressure sensor and the second pressure sensor are configured to measure a pressure within the second gas flow path. The temperature sensor is configured to measure a temperature within the second gas flow path. The second valve is connected to the fifth end portion of the second gas flow path. The third gas flow path includes a sixth end portion and a plurality of seventh end portions. The sixth end portion is connected to the second valve. The plurality of seventh end portions are connected to the plurality of exhaust flow paths, respectively.

The method according to an aspect includes: (i) evacuating the first gas flow path of one gas supply unit among the plurality of gas supply units, the second gas flow path, and the third gas flow path; (ii) after execution of the evacuating, storing a gas in the first gas flow path of the one gas supply unit and the second gas flow path, in which the first valve of the one gas supply unit is opened, the second valve is closed, and the ON/OFF valve connected to the third end portion of the one gas supply unit is closed; (iii) acquiring a first measurement value and a second measurement value of the pressure within the second gas flow path by using the first pressure sensor and the second pressure sensor, respectively, in a state where the gas is stored in the first gas flow path of the one gas supply unit and the second gas flow path by execution of the storing of the gas; (iv) after execution of the acquiring of the first measurement value and the second measurement value, exhausting the gas within the second gas flow path, in which the first valve of the one gas supply unit is closed, and the second valve is opened; (v) after execution of the exhausting of the gas within the second gas flow path, diffusing the gas within the first gas flow path of the one gas supply unit to the second gas flow path, in which the first valve of the one gas supply unit is opened, and the second valve is closed; (vi) acquiring a third measurement value and a fourth measurement value of the pressure within the second gas flow path by using the first pressure sensor and the second pressure sensor, respectively, in a state where the gas within the first gas flow path of the one gas supply unit is diffused to the second gas flow path by execution of the diffusing of the gas; (vii) obtaining a calculation value of a volume of the second gas flow path from a previously obtained first initial value of a volume of the first gas flow path of the one gas supply unit, one of the first measurement value and the second measurement value, and one of the third measurement value and the fourth measurement value; and (viii) comparing a previously obtained second initial value of the volume of the second gas flow path to the calculation value.

Each of the plurality of gas supply units of the substrate processing system provides the first gas flow path, and the flow rate measuring system provides the second gas flow path that is used together with the first gas flow path in calculation of a flow rate of a gas according to a build-up method. In order to obtain the flow rate of the gas in the build-up method, a volume of the first gas flow path and a volume of the second gas flow path are required. Since the first gas flow path is disposed within the casing, the temperature within the first gas flow path is less affected by surrounding environments. Meanwhile, the second gas flow path may be affected by surrounding environments, e.g., the temperature of any one of the plurality of chamber bodies. The volume of the second gas flow path is obtained in advance as the second initial value. In the case where a temperature within the second gas flow path when the second initial value was acquired is different from a temperature within the second gas flow path when other parameters required for calculating a flow rate of a gas in a build-up method are acquired, the flow rate of the gas may not be calculated with a high accuracy in a calculation using the second initial value. In the method according to an aspect, when the flow rate measuring system is inspected, the calculation value of the volume of the second gas flow path is obtained. In a case where a temperature of the second gas flow path when a series of steps for acquiring the calculation value is executed is different from a temperature within the second gas flow path when the second initial value was obtained, the calculation value becomes a value different from the second initial value. When the calculation value is different from the second initial value, the temperature within the second gas flow path has changed from the temperature when the second initial value was obtained. Thus, the flow rate of the gas may not be obtained with a high accuracy in the calculation using the second initial value. In the method according to an aspect, since the calculation value is compared to the second initial value, it is possible to inspect whether a flow rate measuring system used in the build-up method is placed in a state suitable for accurately obtaining the flow rate of the gas.

In the exemplary embodiment, the method further includes obtaining a flow rate of a gas output by a selected flow rate controller among the plurality of flow rate controllers of the one gas supply unit. In the obtaining of the flow rate of the gas, in a state where the ON/OFF valve connected to the third end portion of the one gas supply unit is closed, the first valve is opened, the second valve is closed, and the gas is output from the selected flow rate controller, an increase rate of the pressure within the second gas flow path is obtained, and a measurement value of the temperature within the second gas flow path is acquired by the temperature sensor. When an absolute value of a difference between the second initial value and the calculation value is smaller than a predetermined value, the flow rate of the gas output by the selected flow rate controller is obtained from the increase rate, the measurement value of the temperature, and a sum of the first initial value and the second initial value, according to a build-up method. When the absolute value of the difference between the second initial value and the calculation value is equal to or larger than the predetermined value, the flow rate of the gas output by the selected flow rate controller is obtained from the increase rate, the measurement value of the temperature, and a sum of the first initial value and the calculation value, according to a build-up method.

In the exemplary embodiment, the method further includes comparing the first measurement value to the second measurement value. The first measurement value and the second measurement value are measurement values of the pressure within the second gas flow path. Thus, when the first pressure sensor and the second pressure sensor are normally operated, the first measurement value and the second measurement value become substantially equal to each other. In the present exemplary embodiment, since the first measurement value and the second measurement value are compared to each other in this manner, it is possible to determine whether an abnormality occurs in at least one of the first pressure sensor and the second pressure sensor. For example, when a difference between the first measurement value and the second measurement value is equal to or larger than a predetermined value, it may be determined that an abnormality occurs in at least one of the first pressure sensor and the second pressure sensor. When it is determined that an abnormality occurs in at least one of the first pressure sensor and the second pressure sensor, the first pressure sensor and the second pressure sensor may be replaced.

In the exemplary embodiment, the method further includes comparing the third measurement value to the fourth measurement value. The third measurement value and the fourth measurement value are measurement values of the pressure within the second gas flow path. Thus, when the first pressure sensor and the second pressure sensor are normally operated, the third measurement value and the fourth measurement value become substantially equal to each other. In the present exemplary embodiment, since the third measurement value and the fourth measurement value are compared to each other in this manner, it is possible to determine whether an abnormality occurs in at least one of the first pressure sensor and the second pressure sensor. For example, when a difference between the third measurement value and the fourth measurement value is equal to or larger than a predetermined value, it may be determined that an abnormality occurs in at least one of the first pressure sensor and the second pressure sensor. When it is determined that an abnormality occurs in at least one of the first pressure sensor and the second pressure sensor, the first pressure sensor and the second pressure sensor may be replaced.

In the exemplary embodiment, the method further includes acquiring a fifth measurement value and a sixth measurement value of the pressure within the second gas flow path by using the first pressure sensor and the second pressure sensor, respectively, in a state where the gas within the second gas flow path is exhausted by execution of the evacuating, and comparing the fifth measurement value to the sixth measurement value. The fifth measurement value and the sixth measurement value are measurement values of the pressure within the second gas flow path when the gas within the second gas flow path is exhausted. Therefore, when the first pressure sensor and the second pressure sensor are normally operated, each of the fifth measurement value and the sixth measurement value becomes substantially zero. In the present exemplary embodiment, since the fifth measurement value and the sixth measurement value are compared to each other in this manner, it is possible to determine whether at least one of the first pressure sensor and the second pressure sensor has a deviation of a zero point. For example, when the difference between the fifth measurement value and the sixth measurement value is equal to or larger than the predetermined value, it may be determined that at least one of the first pressure sensor and the second pressure sensor has a deviation of a zero point. When it is determined that at least one of the first pressure sensor and the second pressure sensor has a deviation of a zero point, a zero point of each of the first pressure sensor and the second pressure sensor may be adjusted.

In the exemplary embodiment, the method further includes comparing an average value of temperature measurement values acquired by respective temperature sensors of the plurality of flow rate controllers of the one gas supply unit to a predetermined reference value. Since in each of the plurality of gas supply units, the plurality of flow rate controllers are provided in the casing, the temperature measurement values of the respective temperature sensors of the plurality of flow rate controllers of each gas supply unit have to be comparatively stabilized. In the present exemplary embodiment, the average value of the temperature measurement values of the respective temperature sensors of the plurality of flow rate controllers of the one gas supply unit is obtained, and the average value is compared to the reference value. Thus, it is possible to determine whether the temperature within the casing of the one gas supply unit is an abnormal temperature. For example, when a difference between the average value and the reference value is equal to or more than the predetermined value, it may be determined that the temperature within the casing of the one gas supply unit is an abnormal temperature.

In the storing of the gas in the exemplary embodiment, the gas stored in the first gas flow path of the one gas supply unit and the second gas flow path is a gas generated by vaporization of a liquid, and a pressure of the gas stored in the first gas flow path and the second gas flow path is set to a pressure lower than a saturated vapor pressure of the gas.

As described above, it is possible to inspect whether a flow rate measuring system that provides a gas flow path used in a build-up method is placed in a state suitable for accurately obtaining a flow rate of a gas.

Hereinafter, various exemplary embodiments will be described in detail with reference to drawings. Meanwhile, in the respective drawings, the same or corresponding portions will be denoted by the same reference numerals.

Figure 2:
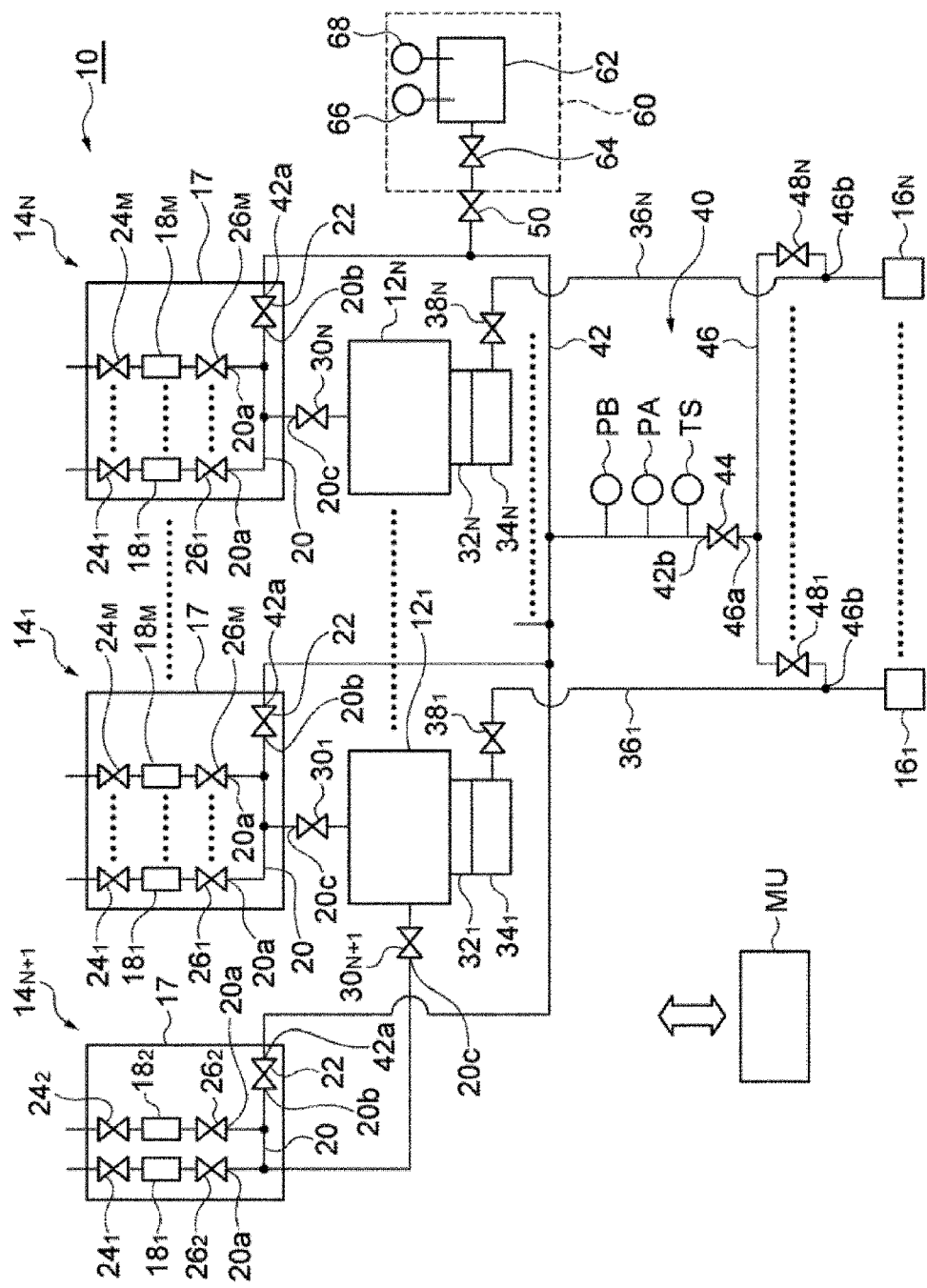
FIG. 2 is a view schematically illustrating a substrate processing system according to the exemplary embodiment.

FIG. 1 is a flow chart illustrating a method of inspecting a flow rate measuring system according to an exemplary embodiment. The method MT illustrated in FIG. 1 is executed to inspect the flow rate measuring system used in a substrate processing system. FIG. 2 is a view schematically illustrating the substrate processing system according to the exemplary embodiment. The method MT may be applicable to a substrate processing system 10 illustrated in FIG. 2.

The substrate processing system 10 includes a plurality of chamber bodies 12, a plurality of gas supply units 14, and a plurality of exhaust devices 16. In the substrate processing system 10, the number of the chamber bodies 12 is N and the number of the exhaust devices 16 is N. In the substrate processing system 10, the number of the gas supply units 14 is N+1. "N" is an integer of 2 or more. Meanwhile, in the following descriptions and drawings, when one element among N or (N+1) elements of the substrate processing system 10 is referred to, a subscript "i" is added to the end of a reference numeral indicating the element. For example, when one chamber body among the plurality of chamber bodies 12 is referred to, a reference numeral "12$_i$" is used. Here, i is an integer of 1 or more. The substrate processing system 10 includes a plurality of process modules. Each of the plurality of process modules includes a chamber body 12$_i$, a gas supply unit 14$_i$, and an exhaust device 16$_i$ having the same number i.

Within an inner space of each of the plurality of chamber bodies 12, a substrate is accommodated for a substrate processing. Each of the plurality of gas supply units 14 is configured to supply a gas to an inner space of a corresponding chamber body among the plurality of chamber bodies 12. Specifically, in the substrate processing system 10, gas supply units 14$_1$ to 14$_N$ are configured to supply a gas into chamber bodies 12$_1$ to 12$_N$, respectively. A gas supply unit 14$_{N+1}$ is configured to supply a gas into the chamber body 12$_1$. Meanwhile, the gas supply unit 14$_{N+1}$ may be configured to supply a gas to inner spaces of other chamber bodies as well as the chamber body 12$_1$ among the plurality of chamber bodies 12.

Each of the plurality of gas supply units 14 includes a casing 17, a plurality of flow rate controllers 18, a first gas flow path 20, and a first valve 22. Each of the plurality of gas supply units 14 further includes a plurality of primary valves 24, and a plurality of secondary valves 26. In the substrate processing system 10, each of N gas supply units 14$_1$ to 14$_N$ includes M flow rate controllers 18, M primary valves 24, and M secondary valves 26. M is an integer of 2 or more. The gas supply unit 14$_{N+1}$ includes two flow rate controllers 18, two primary valves 24, and two secondary valves 26. Meanwhile, in the following descriptions and drawings, when one element among the plurality of elements of each of the plurality of gas supply units 14 is referred to, a subscript "j" is added to the end of a reference numeral indicating the element. For example, when one flow rate controller among the plurality of flow rate controllers 18 is referred to, a reference numeral "18$_j$" is used. Here, j is an integer of 1 or more.

Figure 3:
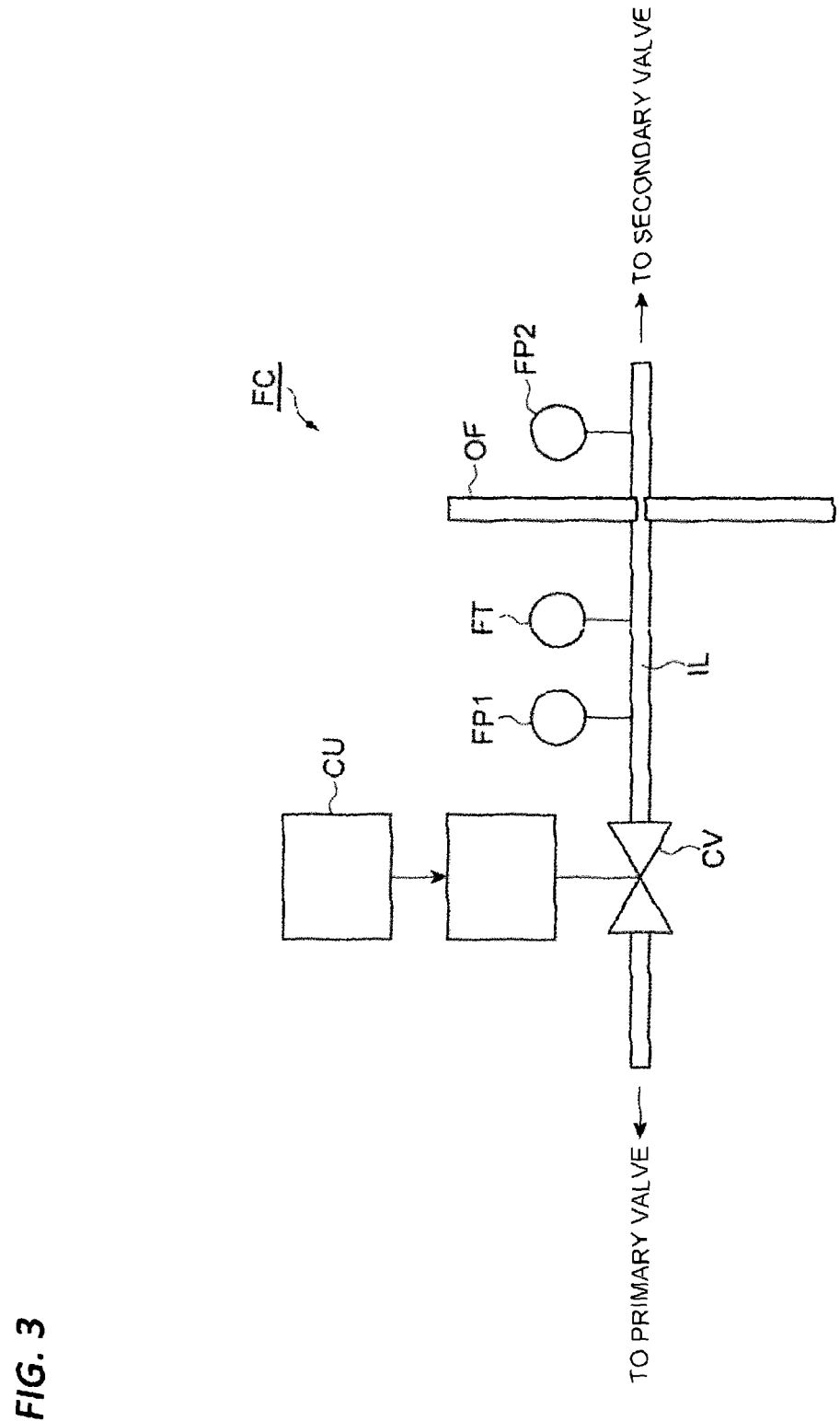
FIG. 3 is a view illustrating a structure of a pressure control-type flow rate controller as an example.

The casing 17 is a container that provides an inner space. The plurality of flow rate controllers 18 are accommodated within the casing 17. Among the plurality of flow rate controllers 18 of the plurality of gas supply units 14, flow rate controllers other than a flow rate controller 18$_1$ of the gas supply unit 14$_{N+1}$ are mass flow controllers or pressure control-type flow rate controllers. FIG. 3 is a view illustrating a structure of a pressure control-type flow rate controller as an example. A flow rate controller FC illustrated in FIG. 3 may be used as flow rate controllers other than the flow rate controller 18$_1$ of the gas supply unit 14$_{N+1}$ among the plurality of flow rate controllers 18 of the plurality of gas supply units 14.

The flow rate controller FC includes a control valve CV, a flow path IL, an orifice member OF, a pressure sensor FP1, a temperature sensor FT, and a pressure sensor FP2. One end of the flow path IL is connected to a primary valve. The other end of the flow path IL is connected to a secondary valve. The orifice member OF partially reduces a cross-sectional area of the flow path IL between one end and the other end of the flow path IL. At the upstream side of the orifice member OF, the control valve CV is provided on the flow path IL. The pressure sensor FP1 is configured to measure the pressure within the flow path IL between the control valve CV and the orifice member OF, that is, at the primary side of the orifice member OF. The temperature sensor FT is configured to measure the temperature within the flow path IL between the control valve CV and the orifice member OF, that is, at the primary side of the orifice member OF. The pressure sensor FP2 is configured to measure the pressure within the flow path IL between the orifice member OF and the other end of the flow path IL.

In the flow rate controller FC, when the pressure at the primary side (upstream side) of the orifice member OF is equal to or more than twice the pressure of the flow path IL at the downstream side (secondary side) of the orifice member OF, the opening degree of the control valve CV is controlled by a controller CU so as to reduce a difference between a set flow rate and a flow rate obtained from a measurement value of a pressure acquired by the pressure sensor FP1. Meanwhile, when the pressure at the primary side (upstream side) of the orifice member OF is smaller than twice the pressure of the flow path IL at the downstream side (secondary side) of the orifice member OF, the opening degree of the control valve CV is controlled by the controller CU so as to reduce a difference between the set flow rate and a flow rate obtained from a difference between a measurement value of a pressure acquired by the pressure sensor FP1 and a measurement value of a pressure acquired by the pressure sensor FP2. Meanwhile, the flow rate controller FC may not include the pressure sensor FP2 when used in a state where the pressure at the primary side (upstream side) of the orifice member OF is equal to or more than twice the pressure of the flow path IL at the downstream side (secondary side) of the orifice member OF.

Refer to FIG. 2 again. As described above, among the plurality of flow rate controllers 18 of the plurality of gas supply units 14, each of flow rate controllers other than the flow rate controller 18$_1$ of the gas supply unit 14$_{N+1}$ may be a mass flow controller. Like the pressure control-type flow rate controller, the mass flow controller includes a temperature sensor. The flow rate controller 18$_1$ of the gas supply unit 14$_{N+1}$ is a mass flow controller, and may have a function of vaporizing a liquid.

The primary sides of the plurality of flow rate controllers 18 are connected to the plurality of primary valves 24, respectively. Each of primary valves other than a primary valve 24$_1$ of the gas supply unit 14$_{N+1}$ among the plurality of primary valves 24 is connected to a corresponding gas source provided at the primary side (upstream side) of the primary valve. The primary valve 24$_1$ of the gas supply unit 14$_{N+1}$ is connected to a liquid source provided at the primary side thereof. The secondary sides of the plurality of flow rate controllers 18 are connected to the plurality of secondary valves 26, respectively.

The first gas flow path 20 includes a plurality of first end portions 20$a$, a second end portion 20$b$, and a third end portion 20$c$. The plurality of first end portions 20$a$ are connected to the secondary sides of the plurality of flow rate controllers 18 through the plurality of secondary valves 26. The first gas flow path 20 includes a plurality of flow paths extending from the plurality of first end portions 20$a$, and the plurality of flow paths are connected to a common flow path. One end of the common flow path of the first gas flow path 20 corresponds to the second end portion 20$b$. A portion of the first gas flow path 20 extending from the plurality of first end portions 20$a$ to the second end portion 20$b$ is provided within the casing 17. The third end portion 20$c$ is provided outside the casing 17. A flow path including the third end portion 20$c$ is connected to the above described common flow path of the first gas flow path 20. The third end portion 20$c$ is connected to the inner space of a corresponding chamber body among the plurality of chamber bodies 12, through a corresponding ON/OFF valve [30(30$_i$)]. The second end portion 20$b$ is connected to the first valve 22. The first valve 22 is provided within the casing 17.

The substrate processing system 10 includes a plurality of pressure control valves 32, a plurality of turbo molecular pumps 34, a plurality of exhaust flow paths 36, and a plurality of valves 38. Each of the plurality of pressure control valves 32 is, for example, an automatic pressure control valve. A pressure control valve 32$_i$ is configured to adjust the pressure of an inner space of a corresponding chamber body 12$_i$. An exhaust flow path 36$_i$ is connected to the inner space of the corresponding chamber body 12 through the pressure control valve 32$_i$ and a turbo molecular pump 34$_i$. A valve 38$_i$ is provided on the exhaust flow path 36$_i$. At the downstream of the valve 38$_i$, the exhaust device 16$_i$ is connected to the exhaust flow path 36$_i$. Each of the plurality of exhaust devices 16 may be, for example, a dry pump.

As illustrated in FIG. 2, a flow rate measuring system 40 is connected to the substrate processing system 10 so as to measure a flow rate of a gas output by each of the plurality of flow rate controllers 18. The flow rate measuring system 40 provides gas flow paths and various sensors used for measuring a flow rate of a gas according to a build-up method. Specifically, the flow rate measuring system 40 includes a second gas flow path 42, a first pressure sensor PA, a second pressure sensor PB, a temperature sensor TS, a second valve 44, and a third gas flow path 46.

The second gas flow path 42 includes a plurality of fourth end portions 42a and a fifth end portion 42b, and extends from the plurality of fourth end portions 42a to the fifth end portion 42b. Each of the plurality of fourth end portions 42a is connected to the first valve 22 of a corresponding gas supply unit among the plurality of gas supply units 14. The second gas flow path 42 includes a plurality of flow paths including the plurality of fourth end portions 42a, respectively, and a common flow path to which the plurality of flow paths are connected. The common flow path of the second gas flow path 42 includes the fifth end portion 42b.

Each of the first pressure sensor PA and the second pressure sensor PB is configured to measure the pressure within the second gas flow path 42. The temperature sensor TS is configured to measure the temperature within the second gas flow path 42. The second valve 44 is connected to the fifth end portion 42b of the second gas flow path 42. The third gas flow path 46 includes a sixth end portion 46a and a plurality of seventh end portions 46b, and extends from the sixth end portion 46a to the plurality of seventh end portions 46b. The sixth end portion 46a is connected to the second valve 44. The third gas flow path 46 is split into N flow paths from a common flow path including the sixth end portion 46a. The plurality of seventh end portions 46b are end portions of the N flow paths of the third gas flow path 46, and are connected to the plurality of exhaust flow paths 36, respectively. N valves 48 are provided on the N flow paths of the third gas flow path 46, respectively.

In the exemplary embodiment, the flow rate measuring system 40 may further include a valve 50. A first port of the valve 50 is connected to the second gas flow path 42. In the present exemplary embodiment, the second gas flow path 42 further includes a flow path extending from the first port of the valve 50. A reference device 60 may be connected to a second port of the valve 50. The reference device 60 includes a tank 62, a valve 64, a pressure sensor 66, and a temperature sensor 68. The pressure sensor 66 is configured to measure the pressure within the tank 62. The temperature sensor 68 is configured to measure the temperature within the tank 62. A second port of the valve 64 is connected to the inner space of the tank 62. A first port of the valve 64 may be connected to the second port of the valve 50. Meanwhile, the connection between the first port of the valve 64 and the second port of the valve 50 is releasable. That is, the reference device 60 may be separated from the flow rate measuring system 40. The inner space of the tank 62 has a known volume $V_{62}$. The volume $V_{62}$ includes a volume of a flow path between the tank 62 and the second port of the valve 50. Otherwise, the volume of the flow path between the tank 62 and the second port of the valve 50 is negligibly small.

In the exemplary embodiment, the substrate processing system 10 may further include a main controller MU. The main controller MU may be a computer device that includes, for example, a processor such as a CPU, a storage device such as a memory, an input device such as a keyboard, and a display device. The main controller MU executes a control program stored in the storage device, by the processor, and controls respective units of the substrate processing system 10 and respective units of the flow rate measuring system 40 according to recipe data stored in the storage device. Meanwhile, the method MT may be executed under the control of the respective units of the substrate processing system 10 and the respective units of the flow rate measuring system 40 by the main controller MU.

In the method MT, a first initial value $V_{D1}$ and a second initial value $V_{D2}$ are used. The first initial value $V_{D1}$ is a volume of the first gas flow path 20 of the gas supply unit $14_i$ as an inspection target, and a corresponding volume obtained in advance before the method MT is executed. The second initial value $V_{D2}$ is a volume of the second gas flow path 42 obtained in advance before the method MT is executed. Meanwhile, before the method MT is executed, for each of all the gas supply units 14, the first initial value, that is, the volume of the first gas flow path 20 may be obtained. The volume of the first gas flow path 20 affects a responsiveness of a flow rate control of a gas of the gas supply unit. That is, when the volume of the first gas flow path 20 is small, the responsiveness of the flow rate control of the gas increases. Therefore, by obtaining in advance the volumes of the first gas flow paths 20 of all the gas supply units 14, the responsiveness of each of the gas supply units 14 may be grasped.

Figure 4:
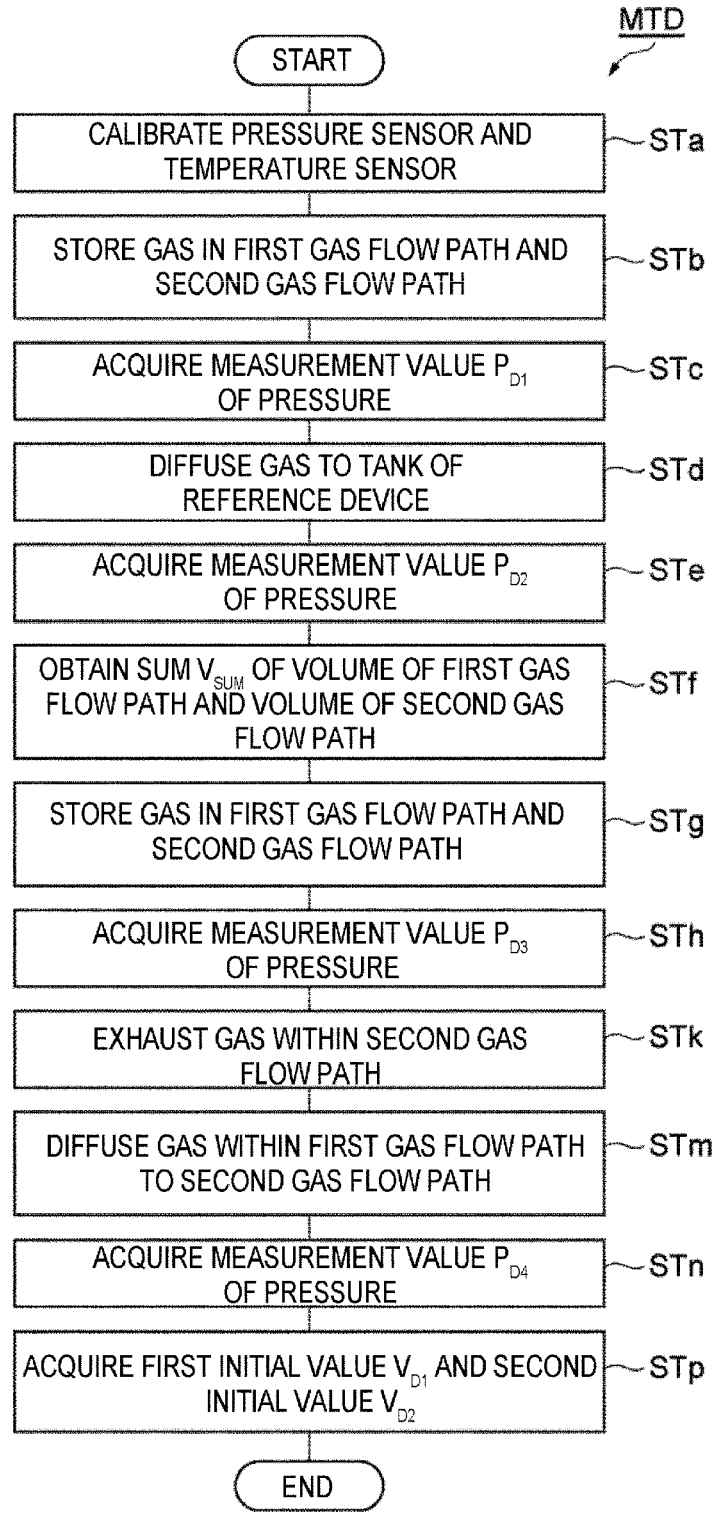
FIG. 4 is a flow chart illustrating a method of calculating a first initial value and a second initial value.

FIG. 4 is a flow chart illustrating a method of calculating a first initial value and a second initial value. When the method MTD illustrated in FIG. 4 is executed, the reference device 60 is connected to the flow rate measuring system 40. That is, the first port of the valve 64 of the reference device 60 is connected to the second port of the valve 50.

As illustrated in FIG. 4, in the method MTD, first, a step STa is executed. In the step STa, the first pressure sensor PA, the second pressure sensor PB, and the temperature sensor TS are calibrated. In the step STa, the first valve 22 of one gas supply unit $14_i$ among the plurality of gas supply units 14 [that is, the gas supply unit $14_i$ as an inspection target], the valve 50, and the valve 64 are opened, and the second valve 44 is closed. The first valve 22 of each of other gas supply units among the plurality of gas supply units 14 is closed. Then, a gas output by at least one flow rate controller among the plurality of flow rate controllers 18 of the gas supply unit $14_i$ is stored in the first gas flow path 20 of the gas supply unit $14_i$, the second gas flow path 42, the inner space of the tank 62, and a flow path connecting the tank 62 to the second gas flow path 42. Subsequently, the output of the gas from the plurality of flow rate controllers 18 of the gas supply unit $14_i$ is stopped. For example, the plurality of secondary valves 26 of the gas supply unit 14i are closed. Then, after the pressure within the second gas flow path 42 and the pressure within the tank 62 are stabilized, the first pressure sensor PA and the second pressure sensor PB are calibrated such that the measurement value of the pressure of the first pressure sensor PA and the measurement value of the pressure of the second pressure sensor PB coincide with the measurement value of the pressure of the pressure sensor 66, and the temperature sensor TS is calibrated such that the measurement value of the temperature of the temperature sensor TS coincides with the measurement value of the temperature of the temperature sensor 68. Then, the gas within the first gas flow path 20 of the gas supply unit $14_i$, the second gas flow path 42, the inner space of the tank 62, and the flow path connecting the tank 62 to the second gas flow path 42 is exhausted.

In the method MTD, subsequently, a step STb is executed. In the step STb, a gas is stored in the first gas flow path 20 of the gas supply unit $14_i$ and the second gas flow path 42. In the step STb, the first valve 22 of the gas supply unit $14_i$ is opened. The second valve 44, the valve 50, and the first valve 22 of each of other gas supply units among the plurality of gas supply units 14 are closed. Then, a gas output by at least one flow rate controller among the plurality of flow rate controllers 18 of the gas supply unit $14_i$ is stored in the first gas flow path 20 of the gas supply unit $14_i$ and the second gas flow path 42. Then, the output of the gas from the plurality of flow rate controllers 18 of the gas supply unit $14_i$ is stopped. For example, the plurality of secondary valves 26 of the gas supply unit $14_i$ are closed.

Subsequently, a step STc is executed. In the step STc, in the state where the gas is stored in the first gas flow path 20 of the gas supply unit $14_i$ and the second gas flow path 42 by the execution of the step STb, a measurement value $P_{D1}$ of the pressure is acquired by the first pressure sensor PA or the second pressure sensor PB.

Subsequently, a step STd is executed. In the step STd, the gas stored in the first gas flow path 20 of the gas supply unit $14_i$ and the second gas flow path 42 is diffused into the tank 62. Specifically, in the step STd, the valve 50 and the valve 64 are opened.

Subsequently, a step STe is executed. In the step STe, a measurement value $P_{D2}$ of the pressure is acquired by any one of the first pressure sensor PA, the second pressure sensor PB, and the pressure sensor 66.

The measurement value $P_{D1}$ of the pressure and the measurement value $P_{D2}$ of the pressure satisfy the relationship in the following equation (1) according to Boyle Charles' law under the premise that the temperature within the second gas flow path 42 at the time of execution of the step STc and the temperature within the second gas flow path 42 at the time of execution of the step STe are substantially equal to each other.

$$P_{D1} \times V_{SUM} = P_{D2} \times (V_{SUM} + V_{62}) \quad (1)$$

In Equation (1), $V_{sum}$ is the sum of the volume of the first gas flow path 20 of the gas supply unit M, and the volume of the second gas flow path 42, and $V_{62}$ is a known volume of the inner space of the tank 62. When Equation (1) is transformed, the following equation (1a) is obtained.

$$V_{SUM} = V_{62} \times P_{D2}/(P_{D1} - P_{D2}) \quad (1a)$$

In a step STf of the method MTD, the sum ($V_{SUM}$) of the volume of the first gas flow path 20 of the gas supply unit $14_i$ and the volume of the second gas flow path 42 is obtained by calculation of Equation (1a).

Meanwhile, when the measurement value of the temperature of the temperature sensor TS is different from the measurement value of the temperature of the temperature sensor 68 during the execution of the step STe, the measurement value $P_{D1}$ of the pressure and the measurement value $P_{D2}$ of the pressure satisfy the relationship in the following Equation (1b) according to Boyle Charles' law.

$$P_{D1} \times V_{SUM}/T_{SC} = P_{D2} \times V_{SUM}/T_{SE} + P_{D2} \times V_{62}/T_{68} \quad (1b)$$

In Equation (1b), $T_{SC}$ is the measurement value of the temperature measured by the temperature sensor TS during the execution of the step STc, $T_{SE}$ is the measurement value of the temperature measured by the temperature sensor TS during the execution of the step STe, and $T_{68}$ is the measurement value of the temperature measured by the temperature sensor 68 during the execution of the step STe. When Equation (1b) is transformed, the following equation (1c) is obtained.

$$V_{SUM} = V_{62} \times P_{D2}/T_{68}/(P_{D1}/T_{SC} - P_{D2}/T_{SE}) \quad (1c)$$

When the measurement value of the temperature of the temperature sensor TS is different from the measurement value of the temperature of the temperature sensor 68 during the execution of the step STe, in the step STf of the method MTD, the sum ($V_{SUM}$) of the volume of the first gas flow path 20 of the gas supply unit $14_i$ and the volume of the second gas flow path 42 is obtained by calculation of Equation (1c).

Subsequently, in the method MTD, the gas within the first gas flow path 20 of the gas supply unit $14_i$, the second gas flow path 42, the inner space of the tank 62, and the flow path connecting the tank 62 to the second gas flow path 42 is exhausted. Then, a step STg is executed. In the step STg, a gas is stored in the first gas flow path 20 of the gas supply unit $14_i$ and the second gas flow path 42. In the step STg, the first valve 22 of the gas supply unit $14_i$ is opened. The second valve 44, the valve 50, and the first valve 22 of each of other gas supply units among the plurality of gas supply units 14 are closed. Then, a gas output by at least one flow rate controller among the plurality of flow rate controllers 18 of the gas supply unit $14_i$ is stored in the first gas flow path 20 of the gas supply unit $14_i$ and the second gas flow path 42. Then, the output of the gas from the plurality of flow rate controllers 18 of the gas supply unit $14_i$ is stopped. For example, the plurality of secondary valves 26 of the gas supply unit $14_i$ are closed.

Subsequently, a step STh is executed. In the step STh, in the state where the gas is stored in the first gas flow path 20 of the gas supply unit $14_i$ and the second gas flow path 42 by the execution of the step STg, a measurement value $P_{D3}$ of the pressure is acquired by the first pressure sensor PA or the second pressure sensor PB.

Subsequently, a step STk is executed. In the step STk, the gas within the second gas flow path 42 is exhausted. Specifically, the first valve 22 of the gas supply unit $14_i$ is closed, the second valve 44 is opened, and the valve 48 connected to at least one exhaust device among the plurality of exhaust devices 16 is opened. Meanwhile, the plurality of valves 48 may be continuously opened during the execution of the method MT and the method MTD.

Subsequently, a step STm is executed. In the step STm, the gas within the first gas flow path 20 of the gas supply unit $14_i$ is diffused to the second gas flow path 42. Specifically, the second valve 44 is closed, and the first valve 22 of the gas supply unit $14_i$ is opened.

Subsequently, a step STn is executed. In the step STn, in the state where the gas within the first gas flow path 20 of the gas supply unit $14_i$ is diffused to the second gas flow path 42, a measurement value $P_{D4}$ of the pressure is acquired by the first pressure sensor PA or the second pressure sensor PB.

The measurement value $P_{D3}$ of the pressure and the measurement value $P_{D4}$ of the pressure satisfy the relationship in the following equation (2) according to Boyle Charles' law under the premise that the temperature within the first gas flow path 20 of the gas supply unit $14_i$ at the time of execution of the step STh and the temperature of the second gas flow path 42 at the time of execution of the step STn are substantially equal to each other.

$$P_{D3} \times V_1 = P_{D4} \times (V_1 + V_2) \quad (2)$$

In Equation (2), $V_1$ is a volume of the first gas flow path 20 of the gas supply unit $14_i$, and $V_2$ is a volume of the second gas flow path 42. When Equation (2) is transformed, the following equation (2a) is obtained.

$$V_2 = V_1 \times (P_{D3} - P_{D4})/P_{D4} \quad (2a)$$

Since the sum of $V_1$ and $V_2$ is equal to $V_{SUM}$, the following equation (3) is satisfied.

$$V_1 = V_{SUM} - V_2 \quad (3)$$

When Equation (3) is transformed by using Equation (2a), the following equation (3a) is obtained.

$$V_1 = V_{SUM}/(1 + (P_{D3} - P_{D4})/P_{D4}) \quad (3a)$$

When Equation (3) is transformed, the following Equation (3b) is obtained.

$$V_2 = V_{SUM} - V_1 \quad (3b)$$

In a step STp of the method MTD, $V_1$ obtained by a calculation of Equation (3a) is acquired as the first initial value $V_{D1}$ of the volume of the first gas flow path 20 of the gas supply unit $14_i$. $V_2$ obtained by a calculation of Equation (3b) is acquired as the second initial value $V_{D2}$ of the volume of the second gas flow path 42.

Meanwhile, in the step STk, the gas within the second gas flow path 42 may not be completely exhausted. In this case, a measurement value $P_{D5}$ of the pressure within the second gas flow path 42 in the exhausted state in the step STk is acquired. The measurement value $P_{D5}$ of the pressure may be the measurement value of the first pressure sensor PA, the measurement value of the second pressure sensor PB, or an average value of these measurement values. When the measurement value $P_{D5}$ is the measurement value of the first pressure sensor PA, each of the measurement value $P_{D3}$ and the measurement value $P_{D4}$ is also the measurement value of the first pressure sensor PA. When the measurement value $P_{D5}$ is the measurement value of the second pressure sensor PB, each of the measurement value $P_{D3}$ and the measurement value $P_{D4}$ is also the measurement value of the second pressure sensor PB. Otherwise, when the measurement value $P_{D5}$ is an average value of the measurement value of the first pressure sensor PA and the measurement value of the second pressure sensor PB, each of the measurement value $P_{D3}$ and the measurement value $P_{D4}$ is also an average value of the measurement value of the first pressure sensor PA and the measurement value of the second pressure sensor PB. Here, the following Equation (3c) is established from Boyle Charles' law.

$$P_{D3} \times V_1 + P_{D5} \times V_2 = P_{D4} \times (V_1 + V_2) \quad (3c)$$

From Equation (3c), the following equation (3d) is obtained.

$$V_1 = V_{SUM}/(1 + (P_{D3} - P_{D4})/(P_{D4} - P_{D5})) \quad (3d)$$

In the step STp of the method MTD, $V_1$ obtained by a calculation of Equation (3d) may be acquired as the first initial value $V_{D1}$ of the volume of the first gas flow path 20 of the gas supply unit $14_i$, and $V_2$ obtained by a calculation of Equation (3b) may be acquired as the second initial value $V_{D2}$ of the volume of the second gas flow path 42. According to Equation (3c), a difference between the measurement values of the pressures acquired by the same pressure sensor, or a difference between average values of the measurement values of the pressures acquired by two pressure sensors is used. Therefore, even when a pressure sensor has a deviation of a zero point, the deviation of the zero point of the pressure sensor is canceled in the calculation of Equation (3c).

Hereinafter, refer to FIG. 1 again. At the time of execution of the method MT, the valve 50 is closed, and the reference device 60 may be separated from the flow rate measuring system 40. Then, in the method MT, a step ST1 is executed. In the step ST1, it is determined whether to start an inspection. The inspection is executed by using the gas supply unit $14_i$ of one process module that is not executing a substrate processing, among a plurality of process modules of the substrate processing system 10. Whether to start the inspection may be determined by an operator (manually). Otherwise, whether to start the inspection may be automatically determined by the main controller MU. For example, it may be determined that the inspection is started when an elapsed time from a previous time inspection, that is, a previous time execution of the method MT using the gas supply unit $14_i$, is equal to or longer than a predetermined time. Otherwise, the flow rate of a gas output by a flow rate controller $18_j$ of the gas supply unit $14_i$ may be obtained by a build-up method, and it may be determined that the inspection is started when the obtained flow rate of the gas is different from a previously obtained flow rate of the gas output by the flow rate controller $18_j$, by a predetermined value or more. In the step ST1, when it is determined that the inspection is not started, the method MT is ended. Meanwhile, in the step ST1, when it is determined that the inspection is started, a step ST2 is executed.

In the step ST2, an average value $T_{ave}$ of temperature measurement values acquired by respective temperature sensors [e.g., the temperature sensors FT] of the plurality of flow rate controllers 18 of the gas supply unit $14_i$ is compared to a predetermined reference value $T_{ref}$. In the step ST2, for example, it is determined whether an absolute value of a difference between the average value $T_{ave}$ and the reference value $T_{ref}$ is smaller than a predetermined value $T_{th}$. The reference value $T_{ref}$ is a predetermined value for determining whether the temperature of the casing 17 of the gas supply unit $14_i$ is stabilized. Since in each of the plurality of gas supply units 14, the plurality of flow rate controllers 18 are provided in the casing 17, the temperature measurement values of the respective temperature sensors of the plurality of flow rate controllers 18 of each gas supply unit have to be comparatively stabilized. In the step ST2, since the average value $T_{ave}$ is compared to the reference value $T_{ref}$, it is possible to determine whether the temperature within the casing 17 of the gas supply unit $14_i$ is an abnormal temperature. For example, when a difference between the average value $T_{ave}$ and the reference value $T_{ref}$ is equal to or more than the predetermined value $T_{th}$, it may be determined that the temperature within the casing 17 of the gas supply unit $14_i$ is an abnormal temperature. When it is determined that the temperature within the casing 17 of the gas supply unit $14_i$ is the abnormal temperature, for example, an alarm signal occurs, and the method MT is ended. Meanwhile, when a difference between the average value $T_{ave}$ and the reference value $T_{ref}$ is smaller than the predetermined value $T_{th}$, a step ST3 is executed.

In the step ST3, the first gas flow path 20 of the gas supply unit $14_i$, the second gas flow path 42, and the third gas flow path 46 are evacuated. Specifically, the first valve 22 of the gas supply unit $14_i$, and the second valve 44 are opened. The valve 48 connected to at least one exhaust device among the plurality of exhaust devices 16, e.g., a valve $48_i$ connected to the exhaust device $16i$, is opened. Meanwhile, as described above, the plurality of valves 48 may be continuously opened during the execution of the method MT. In the step ST3, the first valve 22 of each of gas supply units other than the gas supply unit $14_i$ among the plurality of gas supply units 14 is closed.

Subsequently, a step ST4 is executed. In the step ST4, in a state where the gas within the second gas flow path 42 is exhausted by the execution of the step ST3, a measurement value $P_{A0}$ (fifth measurement value) and a measurement value $P_{B0}$ (sixth measurement value) of the pressure within the second gas flow path 42 are acquired by using the first pressure sensor PA and the second pressure sensor PB, respectively. That is, the measurement value $P_{A0}$ is acquired by the first pressure sensor PA, and the measurement value $P_{B0}$ is acquired by the second pressure sensor PB.

In a subsequent step ST5, the measurement value $P_{A0}$ is compared to the measurement value $P_{B0}$. The measurement value $P_{A0}$ and the measurement value $P_{B0}$ are measurement values of the pressure within the second gas flow path 42 when the gas within the second gas flow path 42 is exhausted. Therefore, when the first pressure sensor PA and the second pressure sensor PB are normally operated, each of the measurement value $P_{A0}$ and the measurement value $P_{B0}$ becomes substantially zero. In the step ST5, since the measurement value $P_{A0}$ and the measurement value $P_{B0}$ are compared to each other in this manner, it is possible to determine whether at least one of the first pressure sensor PA and the second pressure sensor PB has a deviation of a zero point. In the step ST5, for example, it is determined whether an absolute value of a difference between the measurement value $P_{A0}$ and the measurement value $P_{B0}$ is smaller than a predetermined value $P_{th0}$. When the absolute value of the difference between the measurement value $P_{A0}$ and the measurement value $P_{B0}$ is equal to or larger than the predetermined value $P_{th0}$, it may be determined that at least one of the first pressure sensor PA and the second pressure sensor PB has a deviation of a zero point.

When it is determined that at least one of the first pressure sensor PA and the second pressure sensor PB has a deviation of a zero point, it is determined, in a step ST6, whether an adjustment of a zero point of each of the first pressure sensor PA and the second pressure sensor PB, which is to be executed in a step ST7, is a first adjustment of a zero point. When the zero-point adjustment to be executed in the step ST7 is the first zero-point adjustment, the step ST7 is executed. Then, the adjustment of the zero point of each of the first pressure sensor PA and the second pressure sensor PB is performed, and the process returns to the step ST4. Meanwhile, when the zero-point adjustment of each of the first pressure sensor PA and the second pressure sensor PB, which is to be executed in the step ST7, is not the first zero-point adjustment, the first pressure sensor PA and the second pressure sensor PB are replaced in a step ST8 and the method MT is ended.

In the step ST5, when it is determined that the absolute value of the difference between the measurement value $P_{A0}$ and the measurement value $P_{B0}$ is smaller than the predetermined value $P_{th0}$, a step ST9 is executed. In the step ST9, a gas is stored in the first gas flow path 20 of the gas supply unit $14_i$ and the second gas flow path 42. In the step ST9, the first valve 22 of the gas supply unit $14_i$ is opened, the second valve 44 is closed, and the ON/OFF valve $30_i$ is closed. The first valve 22 of each of gas supply units other than the gas supply unit $14_i$ among the plurality of gas supply units 14 is closed. Then, a gas output by at least one flow rate controller among the plurality of flow rate controllers 18 of the gas supply unit $14_i$ is stored in the first gas flow path 20 of the gas supply unit $14_i$, and the second gas flow path 42. Then, the output of the gas from the plurality of flow rate controllers 18 of the gas supply unit $14_i$ is stopped. For example, the plurality of secondary valves 26 of the gas supply unit $14_i$ are closed.

Subsequently, a step ST10 is executed. In the step ST10, in the state where the gas is stored in the first gas flow path 20 of the gas supply unit $14_i$, and the second gas flow path 42 by the execution of the step ST9, a measurement value $P_{A1}$ (first measurement value) of the pressure is acquired by the first pressure sensor PA, and a measurement value $P_{B1}$ (second measurement value) of the pressure is acquired by the second pressure sensor PB.

Subsequently, a step ST11 is executed. In the step ST11, the measurement value $P_{A1}$ and the measurement value $P_{B1}$ are compared to each other. When the first pressure sensor PA and the second pressure sensor PB are normally operated, the measurement value $P_{A1}$ and the measurement value $P_{B1}$ become substantially equal to each other. In the step ST11, since the measurement value $P_{A1}$ and the measurement value $P_{B1}$ are compared to each other in this manner, it is possible to determine whether an abnormality occurs in at least one of the first pressure sensor PA and the second pressure sensor PB. For example, when a difference between the measurement value $P_{A1}$ and the measurement value $P_{B1}$ is equal to or larger than a predetermined value $P_{th1}$, it may be determined that an abnormality occurs in at least one of the first pressure sensor PA and the second pressure sensor PB. When it is determined that an abnormality occurs in at least one of the first pressure sensor PA and the second pressure sensor PB, the first pressure sensor PA and the second pressure sensor PB are replaced in the step ST8. Meanwhile, when a difference between the measurement value $P_{A1}$ and the measurement value $P_{B1}$ is smaller than the predetermined value $P_{th1}$, a step ST12 is executed.

In the step ST12, the gas within the second gas flow path 42 is exhausted. Specifically, the first valve 22 of the gas supply unit $14_i$ is closed, the second valve 44 is opened, and the valve 48 connected to at least one exhaust device among the plurality of exhaust devices 16 is opened. For example, the valve $48_i$ connected to the exhaust device $16_i$ is opened. Meanwhile, the plurality of valves 48 may be continuously opened during the execution of the method MT.

Subsequently, a step ST13 is executed. In the step ST13, the gas within the first gas flow path 20 of the gas supply unit $14_i$ is diffused to the second gas flow path 42. Specifically, the second valve 44 is closed, and the first valve 22 of the gas supply unit $14_i$ is opened.

Subsequently, a step ST14 is executed. In the step ST14, in the state where the gas of the first gas flow path 20 of the gas supply unit $14_i$ is diffused to the second gas flow path 42 by the execution of the step ST13, a measurement value $P_{A2}$ (the third measurement value) of the pressure is acquired by the first pressure sensor PA, and a measurement value $P_{B2}$ (the fourth measurement value) of the pressure is acquired by the second pressure sensor PB.

Subsequently, a step ST15 is executed. In the step ST15, the measurement value $P_{A2}$ and the measurement value $P_{B2}$ are compared to each other. When the first pressure sensor PA and the second pressure sensor PB are normally operated, the measurement value $P_{A2}$ and the measurement value $P_{B2}$ become substantially equal to each other. In the step ST15, since the measurement value $P_{A2}$ and the measurement value $P_{B2}$ are compared to each other in this manner, it is possible to determine whether an abnormality occurs in at least one of the first pressure sensor PA and the second pressure sensor PB. For example, when a difference between the measurement value $P_{A2}$ and the measurement value $P_{B2}$ is equal to or larger than a predetermined value $P_{th2}$, it may be determined that an abnormality occurs in at least one of the first pressure sensor PA and the second pressure sensor PB. When it is determined that an abnormality occurs in at least one of the first pressure sensor PA and the second pressure sensor PB, the first pressure sensor PA and the second pressure sensor PB are replaced in the step ST8. Meanwhile, when a difference between the measurement value $P_{A2}$ and the measurement value $P_{B2}$ is smaller than the predetermined value $P_{th2}$, a step ST16 is executed.

In the step ST16, a calculation value $V_C$ of a volume of a second gas flow path is acquired. In the step ST16, one of the measurement value $P_{A1}$ and the measurement value $P_{B1}$, and one of the measurement value $P_{A2}$ and the measurement value $P_{B2}$ are used to obtain the calculation value $V_C$. Also, an average value of the measurement value $P_{A1}$ and the measurement value $P_{B1}$ may be used to obtain the calculation value $V_C$. Otherwise, an average value of the measurement value $P_{A2}$ and the measurement value $P_{B2}$ may be used to obtain the calculation value $V_C$. In the following description, it is assumed that the measurement value $P_{A1}$ and the measurement value $P_{A2}$ are used to obtain the calculation value $V_C$.

The volume $V_1$ of the first gas flow path 20 of the gas supply unit $14_i$, the volume $V_2$ of the second gas flow path, the measurement value $P_{A1}$, and the measurement value $P_{A2}$ satisfy the relationship in the following equation (4) according to Boyle Charles' law.

$$V_1 \times P_{A1} = (V_1 + V_2) \times P_{A2} \quad (4)$$

When Equation (4) is transformed, the following equation (4a) is obtained.

$$V_2 = V_1 \times (P_{A1} - P_{A2}) / P_{A2} \quad (4a)$$

Accordingly, by substituting the first initial value $V_{D1}$ into the volume $V_1$ of Equation (4a), the calculation value $V_C$ of the volume of the second gas flow path may be obtained by a calculation of the following equation (4b).

$$V_C = V_{D1} \times (P_{A1} - P_{A2}) / P_{A2} \quad (4b)$$

In the step ST16, the calculation value $V_C$ is obtained by the calculation of Equation (4b).

Meanwhile, in the step ST12, the gas within the second gas flow path 42 may not be completely exhausted. In this case, a measurement value $P_{A3}$ of the pressure within the second gas flow path 42 in the exhausted state in the step ST12 is acquired by the first pressure sensor PA. Here, the following equation (4c) is established from Boyle Charles' law.

$$V_1 \times P_{A1} + V_2 \times P_{A3} = (V_1 + V_2) \times P_{A2} \quad (4c)$$

When Equation (4c) is transformed, the following equation (4d) is obtained.

$$V_2 = V_1 \times (P_{A1} - P_{A2}) / (P_{A2} - P_{A3}) \quad (4d)$$

By substituting the first initial value $V_{D1}$ into the volume $V_1$ of Equation (4d), the calculation value $V_C$ of the volume of the second gas flow path may be obtained by a calculation of the following equation (4e).

$$V_C = V_{D1} \times (P_{A1} - P_{A2}) / (P_{A2} - P_{A3}) \quad (4e)$$

In the step ST16, the calculation value $V_C$ may be obtained by the calculation of Equation (4e). Meanwhile, instead of the measurement value $P_{A1}$, the measurement value $P_{A2}$, and the measurement value $P_{A3}$, the measurement value $P_{B1}$ of the pressure, the measurement value $P_{B2}$ of the pressure, and the measurement value $P_{B3}$ of the pressure, which are acquired by the second pressure sensor PB in the steps ST10, ST14, and ST12, respectively, may be used. Otherwise, instead of the measurement value $P_{A1}$, the measurement value $P_{A2}$, and the measurement value $P_{A3}$, an average value of the measurement value $P_{A1}$ and the measurement value $P_{B1}$, an average value of the measurement value $P_{A2}$ and the measurement value $P_{B2}$, and an average value of the measurement value $P_{A3}$ and the measurement value $P_{B3}$ may be used, respectively. In such a calculation of the calculation value $V_C$, a difference between the measurement values of the pressures acquired by the same pressure sensor, or a difference between average values of the measurement values of the pressures acquired by two pressure sensors is used. Therefore, even when a pressure sensor has a deviation of a zero point, the deviation of the zero point of the pressure sensor is canceled in the calculation of the calculation value $V_C$.

Subsequently, a step ST17 is executed. In the step ST17, the second initial value $V_{D2}$ and the calculation value $V_C$ are compared to each other. In the method MT, as described below, the volume of the first gas flow path 20 and the volume of the second gas flow path 42 are used in calculating a flow rate of a gas according to a build-up method. Since the first gas flow path 20 is disposed within the casing 17, the temperature within the first gas flow path 20 is less affected by surrounding environments. Meanwhile, the second gas flow path 42 may be affected by surrounding environments, e.g., the temperature of any one of the plurality of chamber bodies 12 (or the plurality of process modules). The volume of the second gas flow path 42 is obtained in advance as the second initial value $V_{D2}$. In the case where a temperature within the second gas flow path 42 when the second initial value $V_{D2}$ was acquired is different from a temperature within the second gas flow path 42 when other parameters required for calculating a flow rate of a gas in a build-up method are acquired, the flow rate of the gas may not be calculated with a high accuracy in a calculation using the second initial value $V_{D2}$. In the method MT, when the flow rate measuring system 40 is inspected, the calculation value $V_C$ of the volume of the second gas flow path 42 is obtained. In a case where a temperature of the second gas flow path 42 when a series of steps for acquiring the calculation value $V_C$ is executed is different from a temperature within the second gas flow path 42 when the second initial value $V_{D2}$ was obtained, the calculation value $V_C$ becomes a value different from the second initial value $V_{D2}$. When the calculation value $V_C$ is different from the second initial value $V_{D2}$, the temperature within the second gas flow path 42 has changed from the temperature when the second initial value $V_{D2}$ was obtained. Thus, the flow rate of the gas may not be obtained with a high accuracy in the calculation using the second initial value $V_{D2}$. In the method MT, since the calculation value $V_C$ is compared to the second initial value $V_{D2}$, it is possible to inspect whether a flow rate measuring system used in the build-up method is placed in a state suitable for accurately obtaining the flow rate of the gas.

In the step ST17, for example, it is determined whether an absolute value of a difference between the calculation value $V_C$ and the second initial value $V_{D2}$ is smaller than a predetermined value $V_{th}$. When the absolute value of the difference between the calculation value $V_C$ and the second initial value $V_{D2}$ is smaller than the predetermined value $V_{th}$, the second initial value $V_{D2}$ is set as a volume $V_{R2}$ of the second gas flow path 42 (step ST18), which is to be used in the calculation of a flow rate (step ST21) as described below. Meanwhile, when the absolute value of the difference between the calculation value $V_C$ and the second initial value $V_{D2}$ is equal to or larger than the predetermined value $V_{th}$, the calculation value $V_C$ is set as the volume $V_{R2}$ (step ST19).

Subsequently, a step ST20 is executed. In the step ST20, an increase rate ($\Delta P/\Delta t$) of the pressure within the second gas flow path 42, and a measurement value $T_2$ of the temperature within the second gas flow path 42 are acquired. In the step ST20, the first valve 22 of the gas supply unit $14_i$, the second valve 44, and the valve $48_i$ are opened. Meanwhile, all the plurality of valves 48 may be opened. In the step ST20, the ON/OFF valve $30_i$ is closed. Then, a gas is output by the selected flow rate controller $18_j$ among the plurality of flow rate controllers 18 of the gas supply unit $14_i$, and is supplied to the first gas flow path 20 of the gas supply unit $14_i$ and the second gas flow path 42.

In the step ST20, when it is determined that the measurement value of the pressure of one pressure sensor between the first pressure sensor PA and the second pressure sensor PB is stabilized, the second valve 44 is closed. Meanwhile, it may be determined that the measurement value of the pressure of one pressure sensor is stabilized when a variation amount of the measurement value is equal to or smaller than a predetermined variation amount.

Then, in the step ST20, the increase rate (ΔP/Δt) of the pressure within the second gas flow path 42, that is, the increase rate of the measurement value of the pressure of one pressure sensor between the first pressure sensor PA and the second pressure sensor PB, is obtained. The measurement value $T_2$ of the temperature within the second gas flow path 42 is acquired by the temperature sensor TS.

Subsequently, the step ST21 is executed. In the step ST21, a flow rate Q of the gas output by the selected flow rate controller $18_j$ of the gas supply unit $14_i$ is obtained by the following equation (5).

$$Q=(\Delta P/\Delta t)\times(V_{D1}+V_{R2})\times C/T_2 \qquad (5)$$

In Equation (5), C is 22.4/R, and R is a gas constant. In the method MT, through such a calculation, the flow rate Q is obtained with a high accuracy.

Meanwhile, the flow rate Q may be obtained for all the flow rate controllers 18 of the gas supply unit $14_i$. For all the plurality of gas supply units 14, the method MT may be sequentially executed. When the method MT is executed for the gas supply unit $14_{N+1}$, the pressure of a gas stored in the first gas flow path 20 and the second gas flow path 42 by the flow rate controller $18_1$ of the gas supply unit $14_{N+1}$ is set to a pressure lower than a saturated vapor pressure of the gas. Meanwhile, when a gas generated by vaporization of a liquid is used as a single gas, the pressure of a gas that is set to a pressure lower than the saturated vapor pressure may be a pressure of the single gas. When a mixed gas of a gas generated by vaporization of a liquid and another gas is used, the pressure of a gas that is set to a pressure lower than the saturated vapor pressure is a partial pressure of the gas generated by vaporization of the liquid.

As described above, while various exemplary embodiments have been described, various modifications may be configured without being limited to the above described exemplary embodiments. For example, in a modification, a substrate processing system may not include the gas supply unit $14_{N+1}$.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A method of inspecting an accuracy of a flow rate measuring system used in a substrate processing system, wherein the substrate processing system includes:
a plurality of chamber bodies;
a plurality of gas supply units each configured to supply a gas to an inner space of a corresponding chamber body among the plurality of chamber bodies; and
a plurality of exhaust devices connected to inner spaces of the plurality of chamber bodies through a plurality of exhaust flow paths, respectively,
wherein each of the plurality of gas supply units includes:
a casing;
a plurality of flow rate controllers provided within the casing;
a first gas flow path including a plurality of first end portions connected to secondary sides of the plurality of flow rate controllers, respectively, a second end portion, and a third end portion, in which the plurality of first end portions, the second end portion, and a portion extending from the plurality of first end portions to the second end portion are provided within the casing, and the third end portion is provided outside the casing and connected to the inner space of the corresponding chamber body through an ON/OFF valve; and
a first valve provided within the casing and connected to the second end portion, the flow rate measuring system includes:
a second gas flow path including a plurality of fourth end portions and a fifth end portion, in which each of the plurality of fourth end portions is connected to the first valve of a corresponding gas supply unit among the plurality of gas supply units;
a first pressure sensor and a second pressure sensor configured to measure a pressure within the second gas flow path;
a second valve connected to the fifth end portion of the second gas flow path; and
a third gas flow path including a sixth end portion connected to the second valve, and a plurality of seventh end portions connected to the plurality of exhaust flow paths, respectively,
the method comprising:
evacuating the first gas flow path of one gas supply unit among the plurality of gas supply units, the second gas flow path, and the third gas flow path;
after execution of the evacuating, storing a gas in the first gas flow path of the one gas supply unit and the second gas flow path, in which the first valve of the one gas supply unit is opened, the second valve is closed, and the ON/OFF valve connected to the third end portion of the one gas supply unit is closed;
acquiring a first measurement value and a second measurement value of the pressure within the second gas flow path by using the first pressure sensor and the second pressure sensor, respectively, in a state where the gas is stored in the first gas flow path of the one gas supply unit and the second gas flow path by execution of the storing of the gas;
after execution of the acquiring of the first measurement value and the second measurement value, exhausting the gas within the second gas flow path, in which the first valve of the one gas supply unit is closed, and the second valve is opened;
after execution of the exhausting of the gas within the second gas flow path, diffusing the gas within the first gas flow path of the one gas supply unit to the second gas flow path, in which the first valve of the one gas supply unit is opened, and the second valve is closed;
acquiring a third measurement value and a fourth measurement value of the pressure within the second gas flow path by using the first pressure sensor and the second pressure sensor, respectively, in a state where the gas within the first gas flow path of the one gas supply unit is diffused to the second gas flow path by execution of the diffusing of the gas;
obtaining a calculation value of a volume of the second gas flow path from a previously obtained first initial value of a volume of the first gas flow path of the one gas supply unit, one of the first measurement value and the second measurement value, and one of the third measurement value and the fourth measurement value; and comparing a previously obtained second initial value of the volume of the second gas flow path with the calculation value of the volume of the second gas flow path obtained in the obtaining step in order to inspect the accuracy of the flow rate measuring system.

2. The method of claim 1, wherein the flow rate measuring system further includes a temperature sensor configured to measure a temperature within the second gas flow path, the method further comprising:

obtaining a flow rate of a gas output by a selected flow rate controller among the plurality of flow rate controllers of the one gas supply unit, wherein in the obtaining of the flow rate of the gas, in a state where the ON/OFF valve connected to the third end portion of the one gas supply unit is closed, the first valve is opened, the second valve is closed, and the gas is output from the selected flow rate controller, an increase rate of the pressure within the second gas flow path is obtained, and a measurement value of the temperature within the second gas flow path is acquired by the temperature sensor, when an absolute value of a difference between the second initial value and the calculation value is smaller than a predetermined value, the flow rate of the gas output by the selected flow rate controller is obtained from the increase rate, the measurement value of the temperature, and a sum of the first initial value and the second initial value, according to a build-up method, and when the absolute value of the difference between the second initial value and the calculation value is equal to or larger than the predetermined value, the flow rate of the gas output by the selected flow rate controller is obtained from the increase rate, the measurement value of the temperature, and a sum of the first initial value and the calculation value, according to a build-up method.

3. The method of claim 1, further comprising comparing the first measurement value to the second measurement value.

4. The method of claim 1, further comprising comparing the third measurement value to the fourth measurement value.

5. The method of claim 1, further comprising acquiring a fifth measurement value and a sixth measurement value of the pressure within the second gas flow path by using the first pressure sensor and the second pressure sensor, respectively, in a state where the gas within the second gas flow path is exhausted by execution of the evacuating, and comparing the fifth measurement value to the sixth measurement value.

6. The method of claim 1, further comprising:

comparing an average value of temperature measurement values acquired by respective temperature sensors of the plurality of flow rate controllers of the one gas supply unit to a predetermined reference value.

7. The method of claim 1, wherein in the storing of the gas, the gas stored in the first gas flow path of the one gas supply unit and the second gas flow path is a gas generated by vaporization of a liquid, and a pressure of the gas stored in the first gas flow path and the second gas flow path is set to a pressure lower than a saturated vapor pressure of the gas.

* * * * *